Patented Sept. 16, 1952

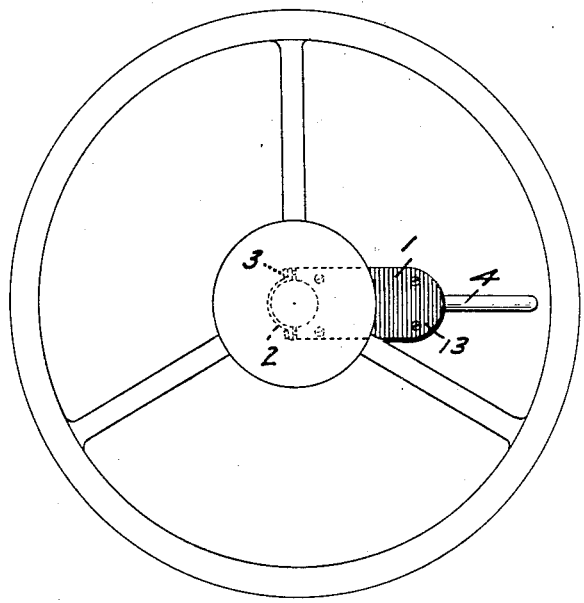
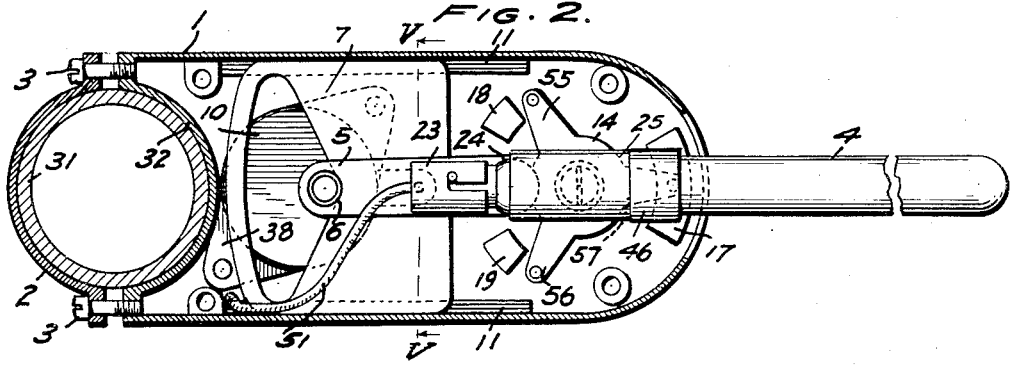

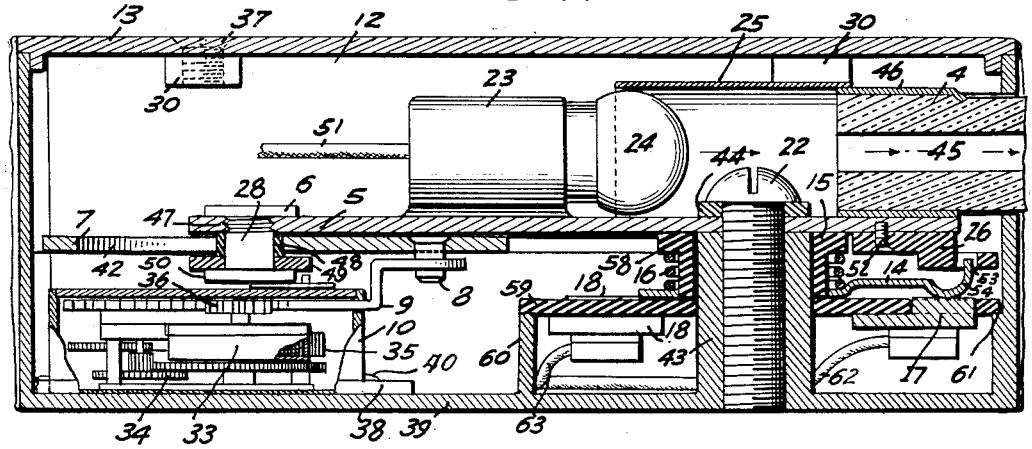
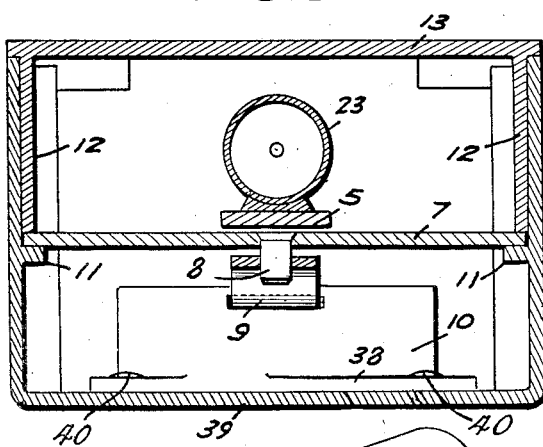
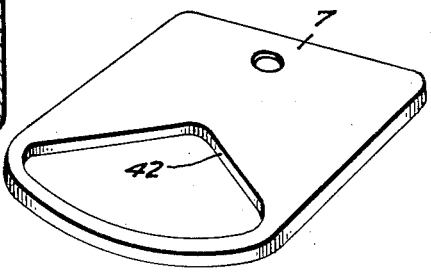
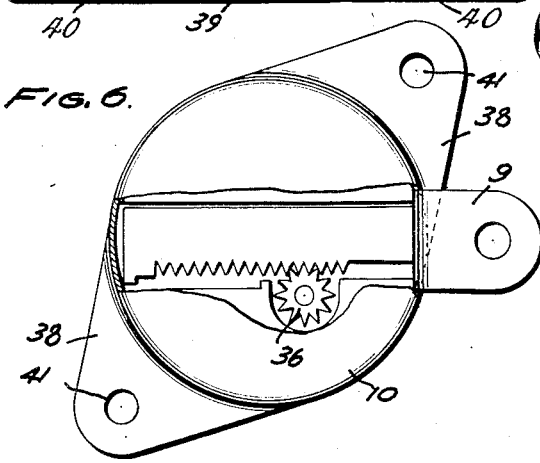

2,611,043

UNITED STATES PATENT OFFICE 2,611,043

SELF-CANCELING DIRECTIONAL SIGNAL SWITCH FOR MOTOR VEHICLES

Antoine Gazda, Providence, R. I.

Application January 13, 1950, Serial No. 138,439

9 Claims. (Cl. 200—35)

This invention relates to self-cancelling directional signal switches for motor vehicles and the like whereby after a signal of the direction which the motor vehicle is about to take has been given, the operator of the vehicle need not give any further attention thereto since after a certain predetermined period the electrical connection establishing the circuit lighting a particular signal is automatically broken.

An object of the invention is to provide a construction which may be easily mounted upon the steering column of automobiles, trucks or other vehicles now in use without extensive modification of the vehicle.

A still further object of the invention is to provide means illuminating the operating handle of the switch only during the period the circuit is closed and to provide an illumination that is clearly visible to the operator.

A further object of the invention is to provide a construction in which a clock mechanism is used controlled by the operating handle to return such handle after it has been moved to close certain circuits to its original or neutral position when such circuits are broken.

With the above and other objects in view which will become apparent from the detailed description below, the invention is shown in the drawings, in which Figure 1 is a plan view of the steering wheel of a vehicle with the invention secured to the steering column thereof;

Figure 2 is a horizontal plan view through the invention showing the parts in neutral position;

Figure 3 is a similar view to Figure 2 illustrating the parts in the positions which they will occupy when the handle has been pivoted to set the directional signals of the vehicle for one direction or the other;

Figure 4 is a partial cross sectional view at right angles to the view shown in Figure 2 along the central line thereof with parts shown in elevation;

Figure 5 is a sectional view taken upon section line V—V looking in the direction of the arrows;

Figure 6 is a plan view with parts broken away of a detail showing the rack for operating the timing mechanism, and Figure 7 is a perspective view of the operating cam.

In the various views similar characters represent like elements.

The signal switch having a body or casing 1 is clamped to the steering column 31 by a plate 2 secured to the casing 1 by means of the screws 3.

The wiring to the directional signals which may be of any electrical type located at the desired positions upon the vehicle is connected in conventional manner through a flashing unit so that when the directional signal is operated the particular directional signal or signals desired are intermittently illuminated.

The casing 1 at the end opposite the clamping plate 2 is provided with a concave portion 32 for cooperating with the steering column 31. Located within the casing in the case 10 is a clock mechanism having a spring 33 cooperating with a gear train 34 and fly-wheel 35. The pinion for winding the spring 33 is shown at 36. A rack 9 cooperates with the pinion 36 so that when the rack 9 is moved, the pinion 36 under the influence of the spring 33 will gradually return the rack 9 to its initial position. The time of such return may be varied by changing the moment of inertia of the fly-wheel 35 or substituting a fly-wheel of different weight so that the return of the rack 9 may be set for any predetermined time interval.

The rack 9 is pivotally connected by a pin 8 to a cam plate 7 shown in perspective in Figure 7. The cam plate 7 is mounted for reciprocating movement in the casing 1 by means of guides 11 secured to the casing 1 and projections or ribs 12 secured to a cover 13 for the casing 1.

The cover 13 is secured to the casing 1 by means of screws 37 screwing into bosses 30 provided upon the casing 1. The case 10 of the timing unit is provided with ears 38 which are secured to the bottom 39 of the casing 1 by means of screws 40 passing through the apertures 41 provided in the ears 38.

The cam plate 7 is provided with a cam track 42 of the configuration particularly shown in Figure 7 and the lever assembly 5 is mounted on the boss 43 by means of the threaded screw 22 so as to pivot thereon. Interposed between the head of the screw 22 and the lever arm 5 is a washer 44. At one end of the lever the operating handle 4 is secured, which is preferably of Lucite having a channel 45 therein. The inner end of the handle 4 is provided with a metallic ferrule 46 which may be soldered to the lever 5 or secured thereto in any desired way. At the other end of the lever 5 a stud pin 6 is screwed into a threaded aperture 47 and the pin 6 is provided with a smooth portion 28 surrounded by a bushing 48 which is held in place by a washer 49 which in turn is held in place by the head of a threaded pin 50 screwed into the bottom of the pin 6. The bushing 48 contacts the cam track 42.

Also mounted upon the lever arm 5 by soldering or the like is a socket 23 in which a light bulb 24 is secured by a bayonet slot. A cover plate 25 extending at one end partly over the ferrule 46 and at the other end over the light bulb 24 directs the light rays from the bulb 24 into the channel 45 of the handle 4. One lead for the light bulb 24 is shown at 51.

Secured to the under side of the lever 5 by screws such as 52 is a bracket member 26 of insulating material and the bracket 26 has therein an aperture 53 into which a prong 54 of a spider 14 extends. The spider 14 has three wings 55, 56 and 57 for making contact with contacts 18, 19 and 17 respectively. The prong 54 is provided on the wing 57.

An insulating bushing 15 encircles the boss 43 and at the top has an overhanging ledge 58 in contact with the under surface of the lever 5. The lower edge of the bushing 15 contacts an insulating plate 59 which rests upon a flange 60 extending from the bottom of the casing 1 and a ledge 61 provided in a wall of the casing 1. The contacts 17, 18 and 19 extend through suitable openings provided in the insulating plate 59. The contacts 17, 18 and 19 have the configuration shown particularly in Figure 2. Extending between the overhanging ledge 58 of the bushing 15 and bearing against the spider 14 is a spring 16 which urges the spider 14 downwardly so that good contact is maintained between the various wings of the spider and the contacts. The lead to the contact 17 is shown at 62, the lead to the contact 18 at 63 and a similar lead extends to the contact 19.

The operation of the signal switch described above is as follows:

When the operator of the vehicle desires to make a turn in one direction or the other, he moves the handle 4 to either the full line position in Figure 3, or to the dotted line position. By moving the handle 4 to the full line position contact is maintained between the wing 57 of the spider 14 and the contact 17 and contact is made between the contact 18 and the wing 55 of spider 14. A circuit is thereby completed to the appropriate direction signal or signals upon the vehicle and also to the pilot light 24.

At the same time when the handle 4 is moved to the full line position in Figure 3, the bushing 48 carried by the pin 6 upon the lever arm 5 moves the cam plate to the right as shown in Figure 3 and at the same time the pin 8 upon the cam plate 7 moves the rack 9 to the right as shown in Figure 4, thereby rotating the pinion 36 and winding the clock spring 33. When the handle 4 is released the clock spring will urge the pinion 36 in its return movement, thereby moving the rack 9 to the left as shown in Figure 4 which in turn gradually moves the cam plate 7 to the left in the same figure and the lever 5 is gradually returned to the neutral position as shown in Figure 2. Shortly before the return to neutral position the wing 55 of spider 14 will leave the contact 18 thereby breaking the circuit through the direction signal or signals which had been illuminated and also breaking the circuit through the pilot light 24. The parts are then in normal position ready for a subsequent operation.

The pilot light 24, due to the cover 25 and the channel 45 in the Lucite handle 4 illuminates the entire length of handle 4 which makes it clearly visible to the operator at all times.

When the rack plate 9 is fully extended the clock spring 33 is set to exert a force to retract the rack 9 at the rate of approximately ½ inch in 15 seconds. The time for the return of the lever 5 and handle 4 to normal position may be set at any desired time by either changing the fly-wheel in the clock mechanism or by other known methods of changing the time factor.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A self-cancelling directional signal switch for motor vehicles and the like comprising a casing, means for securing said casing to the steering column of a vehicle, a series of fixed contacts, a pivoted lever, a movable contact mounted upon said lever for selectively interconnecting said fixed contacts, a reciprocating cam plate movable by said lever, a rack operated by said cam plate and a spring actuated timing mechanism operated by said rack so that when said lever is pivoted circuits are established to the direction signals of the vehicle and said timing mechanism is energized to return said lever to neutral position after the lapse of a predetermined time interval and thereby break said circuits.

2. A self-cancelling directional signal switch for motor vehicles and the like comprising a casing, means for securing said casing to the steering column of a vehicle, a series of fixed contacts, a pivoted lever, a movable contact mounted upon said lever for selectively interconnecting said fixed contacts, a cam plate having an internal cam track reciprocatingly mounted in said casing, a cam pin at one end of said lever cooperating with said cam track, a rack operated by said cam plate and a spring actuated timing mechanism operated by said rack so that when said lever is pivoted circuits are established to the direction signals of the vehicle and said timing mechanism is energized to return said lever to neutral position after the lapse of a predetermined time interval and thereby break said circuits.

3. A self-cancelling directional signal switch as set forth in claim 1 wherein a boss is provided upon said casing upon which said lever is pivoted.

4. A self-cancelling directional signal switch as set forth in claim 1 wherein resilient means are used for urging said movable contact against said fixed contacts.

5. A self-cancelling directional signal switch as set forth in claim 1 wherein said movable contact is in the form of a spider.

6. A self-cancelling directional signal switch as set forth in claim 1 wherein said movable contact is connected with said lever by means of an insulating plate fixed to said lever.

7. A self-cancelling directional signal switch for motor vehicles and the like comprising a casing, means for securing said casing to the steering column of a vehicle, a series of fixed contacts, a pivoted lever, a movable contact mounted upon said lever for selectively interconnecting said fixed contacts, a slidable cam plate in said casing, a cam on one end of said lever cooperating with said cam plate, a light mounted on said lever, a handle at the other end of said lever illuminated by said light, a rack operated by said cam plate and a spring actuated timing mechanism operated by said rack so that when said lever is pivoted circuits are established to the direction signals of the vehicle and to said light and said timing mechanism is energized to return said lever to neutral position after the lapse of a predetermined time interval and thereby break said circuits.

8. A self-cancelling directional signal switch for motor vehicles and the like comprising a casing, a series of fixed contacts, a pivoted lever, a movable contact rotatable upon the pivot of said lever and actuated by said lever for selectively interconnecting said fixed contacts, a cam plate longitudinally and slidably movable by said lever, a spring actuated timing mechanism and means operated by said cam plate so that when said lever is pivoted circuits are established to the directional signals of the vehicle and said timing mechanism is energized to return said lever to neutral position after a predetermined time interval and thereby break said circuits.

9. A self-cancelling directional signal switch for motor vehicles and the like comprising a casing, a series of fixed contacts located within said casing, a lever mounted pivotally in said casing, a movable contact rotatable upon the pivot of said lever and actuated by said lever for selectively interconnecting said fixed contacts, a longitudinally and slidably movable cam plate having a cam track mounted in said casing, a cam pin at one end of said lever slidably cooperating with said cam track and a spring actuated timing mechanism operated by said cam plate so that when said lever is pivoted circuits are established to the direction signals of the vehicle and said timing mechanism is energized to return said lever to neutral position after a predetermined time interval and thereby break said circuits.

ANTOINE GAZDA.

REFERENCES CITED

The following references are of record in the file of this patent:

UNITED STATES PATENTS

| Number | Name | Date |
| --- | --- | --- |
| 1,555,497 | Junghans et al. | Sept. 29, 1925 |
| 1,832,116 | Heising et al. | Nov. 17, 1931 |
| 2,010,454 | Haltrich et al. | Aug. 6, 1935 |
| 2,193,268 | Catron et al. | Mar. 12, 1940 |
| 2,262,170 | Douglas | Nov. 11, 1941 |
| 2,334,882 | Muhleck | Nov. 23, 1943 |